United States Patent [19]

Andro et al.

[11] Patent Number: 4,460,539

[45] Date of Patent: Jul. 17, 1984

[54] DEVICE PROVIDING ANTI-SEISMIC SUPPORT FOR AN APPARATUS IMMERSED IN THE BATH OF LIQUID ALKALI METAL SURROUNDING A FAST NEUTRON NUCLEAR REACTOR

[75] Inventors: Jean Andro, La Celle-Saint-Cloud; Jacques Marjollet, Paris, both of France

[73] Assignee: Stein Industrie, Villacoublay, France

[21] Appl. No.: 268,833

[22] Filed: Jun. 1, 1981

[30] Foreign Application Priority Data

Jun. 2, 1980 [FR] France .................. 80 12190

[51] Int. Cl.³ .............................. G21C 9/00
[52] U.S. Cl. .................... 376/285; 376/292; 376/461; 376/404; 165/74
[58] Field of Search ............... 376/461, 463, 402–405, 376/285, 292, 263, 204, 291; 165/74

[56] References Cited

U.S. PATENT DOCUMENTS

| 1,980,753 | 11/1934 | Gebhard et al. | 165/74 |
| 1,984,581 | 12/1934 | Hasselberg | 165/74 |
| 2,810,849 | 10/1957 | Agule | 165/74 |
| 3,261,611 | 7/1966 | Maidment | 376/203 |
| 4,035,232 | 7/1977 | Kube | 376/292 |
| 4,079,967 | 3/1978 | Schoessow | 376/463 |
| 4,235,284 | 11/1980 | Coleman | 376/461 |
| 4,366,854 | 1/1983 | Artaud et al. | 376/405 |

Primary Examiner—Harvey E. Behrend
Attorney, Agent, or Firm—Oblon, Fisher, Spivak, McClelland & Maier

[57] ABSTRACT

The present invention relates to a device providing anti-seismic support for an apparatus immersed in the bath of liquid alkali metal surrounding a fast neutron nuclear reactor, and abutting by a flange on a slab traversed by the apparatus and resistant to the load that it constitutes, wherein the flange for supporting the apparatus is connected to a sleeve for elastically taking up the horizontal displacements of its top part, independently of an inner envelope of the apparatus and on which a framework for supporting the apparatus whose bottom part is connected to the inner envelope, is fixed at a level determined as a function of the most dangerous earth tremor frequencies.

3 Claims, 2 Drawing Figures

DEVICE PROVIDING ANTI-SEISMIC SUPPORT FOR AN APPARATUS IMMERSED IN THE BATH OF LIQUID ALKALI METAL SURROUNDING A FAST NEUTRON NUCLEAR REACTOR

The present invention relates to a device providing anti-seismic support for an apparatus immersed in the bath of liquid alkali metal surrounding a fast neutron nuclear reactor and abutting by a flange on a slab traversed by said apparatus and resistant to the load that it constitutes.

It is known that such long vertical apparatus are supported by a thick slab, for example made of concrete, which they pass through, when it is not possible to support them by their bottom, particularly when it is question of heat exchangers between primary fluid and secondary fluid in plants producing electrical energy or steam from such nuclear reactors.

Furthermore, such apparatus should be able to withstand earth tremors, due to the dangers of radioactive pollution that rupture thereof would involve. However, their dimensioning, particularly that of the exchangers, as a function of the calorific fluxes to be transmitted, frequently involves their being given diameters and suspended heights such that their natural vibration frequencies are in the range of the dangerous frequencies of the earth tremors observed on the site where the plant of which they form part is implanted.

It is an object of the present invention to overcome this difficulty and to enable such apparatus to be given diameters and heights corresponding to the optimal dimensioning as a function of the technical characteristics to be attained and of the technological possibilities of manufacture, whilst giving them natural vibration frequencies outside the zone of the dangerous frequencies of the earth tremors at their site of implantation.

The supporting device according to the invention is characterised in that the flange for supporting the apparatus on the slab is connected to a sleeve for elastically taking up the horizontal displacements of its top part, independently of an inner envelope of the apparatus, and on which a framework for supporting the apparatus, whose bottom part is connected to the inner envelope, is fixed at a level determined as a function of the most dangerous earth tremor frequencies The choice of three levels of connection between the inner envelope, the supporting framework and the support flange enables the exchanger to have a natural vibration frequency outside the dangerous acceleration peaks due to the earth tremors in the site where the plant is implanted.

A device providing antiseismic support for a heat exchanger between primary sodium coolant and secondary sodium coolant of a plant producing electrical energy or steam from a fast neutron nuclear reactor will now be described with reference to the accompanying drawings, in which.

Figure 1:
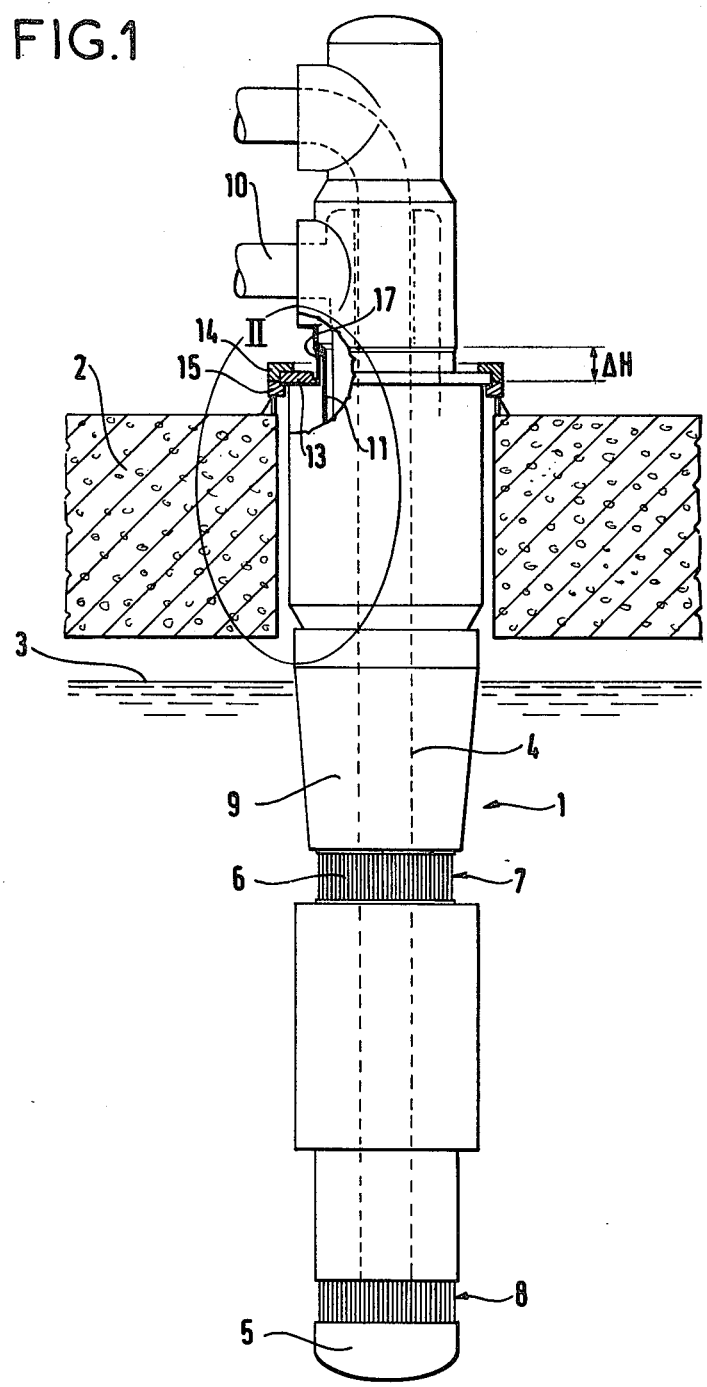
FIG. 1 is a general view in elevation of the exchanger.

Referring now to the drawings, the exchanger 1 is supported by the slab 2 above the bath of primary liquid sodium 3 circulating in the core of the breeder reactor. It comprises an axial conduit 4 for introducing secondary liquid sodium to the bottom 5 of the exchanger. From said exchanger, the secondary sodium rises in the tubes of the tubular bundle 6 in counter-current with respect to the primary sodium introduced around the tubes of the bundle through the annular opening 7 and evacuated through the annular opening 8. The reheated secondary sodium rises through the annular conduit 9 up to the evacuation conduit towards a heat exchange system with a steam raising circuit (not shown).

Figure 2:
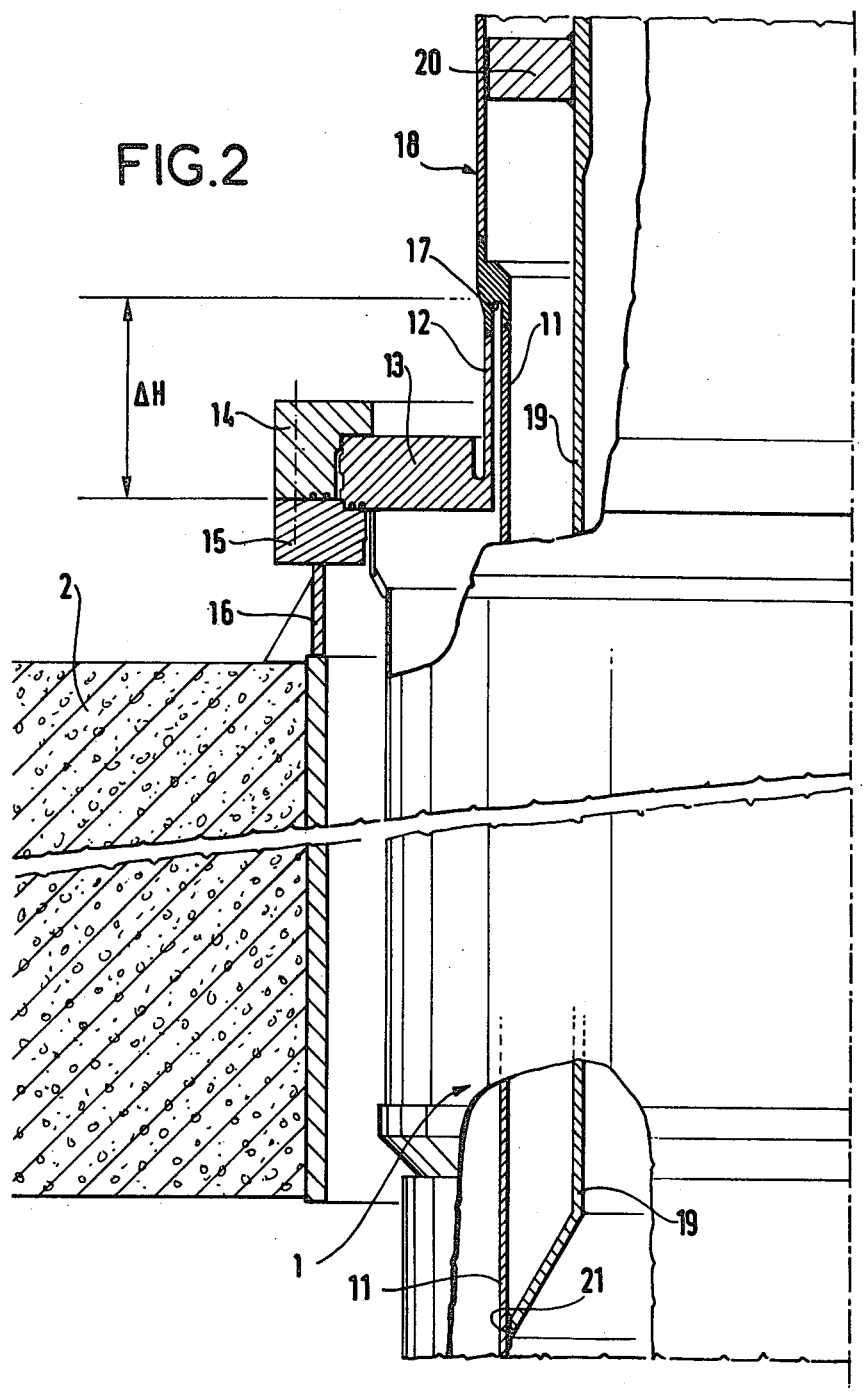
FIG. 2 is a view, to a larger scale, with parts torn away, particularly of the detail II of FIG. 1.

As shown in FIG. 2, the device according to the invention makes it possible, by a sleeve (12,17,18) to take up the horizontal displacements of the top part and of the associated tubing, via the piece 20, but not opposing a differential expansion of the supporting framework 11 and the inner envelope 19, and thus allows the seismic responses of the exchanger and the associated tubing to be partially dissociated.

The choice of the level of fixation of the supporting framework 11 on the sleeve by a λ-shaped piece, at 17, at a position remote by a height ΔH from the support flange 14,15, makes it possible to adapt the swaying frequency of the apparatus by the effect of modification of the rigidity of the supporting framework. The choice of the level of fixation of the supporting framework 11 on the inner envelope 19, at 21, also enables the natural frequencies to be adapted.

Although the device which has just been described in detail with reference to the Figures of the drawings appears preferable, it will be readily understood that various modifications may be made thereto without departing from the scope of the invention, certain of its members being able to be replaced by others performing a similar technical role. In particular, if necessary, the point of suspension of the free height of the exchanger may be fixed below the level of the upper surface of the slab.

The invention may be applied, in addition to the exchangers of the type described in the example, to other apparatus immersed in the bath of liquid alkali metal above the supporting slab, particularly to primary pumps or to integrated purification devices.

What is claimed as new and desired to be secured by Letters Patent of the United States is:

1. In a fast neutron reactor comprising a bath of liquid metal circulating in a core of said reactor, a slab located above said bath of liquid metal, and at least one apparatus supported by said slab, traversing said slab and immersed in said bath of liquid metal, said apparatus including an envelope, an anti-seismic supporting device for supporting said apparatus on said slab, said supporting device comprising:

a support flange supported by said slab;

a vertically oriented sleeve connected to said flange, said sleeve surrounding said envelope and defining a space therebetween;

a supporting framework fixed on said sleeve at a position located at a predetermined height above said support flange for altering the natural frequency of said aparatus, said supporting framework being fixed at a predetermined level on said envelope of the apparatus remote from said predetermined height; and at least one piece located between said sleeve and a top part of said envelope said piece being attached to one of said sleeve and said envelope, said at least one piece being sized and shaped so as to substantially fill said space between said sleeve and said top part of said envelope, whereby said sleeve and said piece take up horizontal displacements of said top part of the envelope while allowing a differential expansion of said framework and said envelope.

2. In a fast neutron reactor according to claim 1, wherein said predetermined level is below said support flange.

3. In a fast neutron reactor according to claim 1, wherein said at least one piece is located above said predetermined height.

* * * * *